US009507445B2

(12) United States Patent
Sutton et al.

(10) Patent No.: US 9,507,445 B2
(45) Date of Patent: Nov. 29, 2016

(54) METHOD AND APPARATUS FOR CONTROLLING DATA OVERLAID UPON AN IMAGE

(71) Applicant: HERE GLOBAL B.V., Veldhoven (NL)

(72) Inventors: Charlie Sutton, San Francisco, CA (US); Brody Larson, San Mateo, CA (US); Sebastian Frey, Woodland Hills, CA (US); Pascal Wever, Los Angeles, CA (US); David Vegezzi, Santa Monica, CA (US); Vidyut Samanta, Santa Monica, CA (US); Julian Bleecker, Sunnyvale, CA (US); Simon James, Sunnyvale, CA (US); Tom Arbisi, Sunnyvale, CA (US); Jeremy Matters, North Hollywood, CA (US); Kevin Walker, Los Angeles, CA (US); Pawena Thimaporn, Woodland Hills, CA (US); John-Rhys Newman, Woodland Hills, CA (US); Duncan Burns, Santa Monica, CA (US); Markus Eklund, Pleasanton, CA (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/540,236

(22) Filed: Nov. 13, 2014

(65) Prior Publication Data

US 2016/0139689 A1 May 19, 2016

(51) Int. Cl.
*G06F 3/0362* (2013.01)
*G06F 3/01* (2006.01)
*H04N 5/265* (2006.01)

(52) U.S. Cl.
CPC ............. *G06F 3/0362* (2013.01); *G06F 3/016* (2013.01); *H04N 5/265* (2013.01)

(58) Field of Classification Search
CPC ........... H04N 1/2112; H04N 1/32128; H04N 2201/3274
See application file for complete search history.

(56) References Cited

U.S. PATENT DOCUMENTS

| 7,406,331 | B2 | 7/2008 | Middleton | |
| 2005/0237410 | A1* | 10/2005 | Shiohara | H04N 5/2351 348/333.01 |
| 2009/0268047 | A1* | 10/2009 | Sogoh | G03B 17/20 348/222.1 |
| 2015/0199503 | A1 | 7/2015 | Zimet et al. | |

OTHER PUBLICATIONS

Canon U.S.A.: "PowerShot N", [online] [retrieved Aug. 14, 2015] <URL: http://www.usa.canon.com/cusa/consumer/products/cameras/digital_cameras/powershot_n> 1 page.

(Continued)

*Primary Examiner* — Huy T Nguyen
(74) *Attorney, Agent, or Firm* — Alston & Bird LLP

(57) ABSTRACT

A method, apparatus and computer program product are provided to facilitate the display of data in conjunction with an image. In the context of a method, an image is caused to be presented and input is received via a rotatable dial wheel while the image is presented. The method also includes determining data to be presented based upon the input. In this regard, the method modifies the data to be presented in response so the rotation of the dial wheel. Further, the method causes the data that is determined based on the input to be presented concurrent with the image.

20 Claims, 9 Drawing Sheets

(56) References Cited

OTHER PUBLICATIONS

"Kodak EasyShare DX7630 Zoom Digital Camera User's Guide" [online] [retrieved Aug. 14, 2015] <URL: http://resources.kodak.com/support/pdf/en/manuals/urg00230/DX7630_GLB_en.pdf> 67 pages.

Sony eSupport: "HDR-TG5V", [online] [retrieved Aug. 14, 2015] <URL: http://esupport.sony.com/US/p/model-home.pl?mdl=HDRTG5V&template_id=&region_id=1&tab=manuals#/manualsTabx 1 page.

U.S. Appl. No. 14/245,454, filed Apr. 4, 2014; In re: Sarasmo; entitled *Accessory Identification and Configuration and Corresponding Accessory*.

* cited by examiner

METHOD AND APPARATUS FOR CONTROLLING DATA OVERLAID UPON AN IMAGE

TECHNOLOGICAL FIELD

An example embodiment relates generally to the overlay of data upon an image and, more particularly, to a method, apparatus and computer program product for controlling the overlay of data upon an image with a rotatable dial wheel.

BACKGROUND

A significant amount of data relating to an image that is presented upon a display may be collected during the capture of the image or may otherwise be available. For example, during the capture and replay of video footage, data may be available relating to the location at which the video footage was captured, the speed at which a user was moving while capturing the video footage, the trace of the path along which the user moved while capturing the video footage, the elevation at which the video footage was captured and the like. As another example, in an instance in which the image is a map image, such as presented by a map application, data relating to the current location and the path of travel to arrive at the current location may be captured or otherwise be available.

The data associated with an image may be displayed concurrently with the image, such as a data overlay upon the image. As such, the user experience may be enhanced by not only facilitating the user's review of the image, but also providing the associated data. In order to select the data to be overlaid upon an image, a display device, such as a camera, a video recorder, a smart phone or the like, may include a plurality of buttons or other hard keys. The buttons or other hard keys may be actuated by a user in order to select the data to be overlaid upon an image. However, the myriad of options available to a user of a display device may require the display device to have a large number of buttons or other hard keys or may require the user to actuate a smaller number of buttons or hard keys in a relatively complex sequence in order to individually make the various selections including the selection of the data to be overlaid upon an image. In a number of instances, it may be impractical for the display device, such as a display device having a relatively small form factor, to have a sufficiently large number of buttons or other hard keys to provide for user selection of the myriad of option available to the user.

Some display devices include touchscreens that may provide a larger number of user inputs, thereby facilitating user selection from among the various options including the selection of the data to be overlaid upon an image. However, inputs provided via touchscreen may sometimes be slower and less precise then is desired. Moreover, the use of a touchscreen in order to provide user input may be cumbersome in some instances, such as in an instance in which the operational mode of the display device is to be switched.

BRIEF SUMMARY

A method, apparatus and computer program product are therefore provided in accordance with an example embodiment in order to facilitate the display of data in conjunction with an image. In this regard, a method, apparatus and computer program product may be provided in order to modify the data that is to be presented in response to user input provided via a rotatable dial wheel. Thus, the method, apparatus and computer program product may provide for an intuitive, precise and responsive input mechanism such that the user experience may be enriched by the more straight forward selection of the data to be displayed concurrent with an image, such as during the capture of video footage, the replay of video footage or the presentation of a map.

In an example embodiment, a method is provided that includes causing an image to be presented and receiving input provided via a rotatable dial wheel while the image is presented. The method of an example embodiment also includes determining data to be presented based upon the input. In this regard, the method modifies the data to be presented in response so the rotation of the dial wheel. Further, the method of this example embodiment causes the data that is determined based on the input to be presented concurrent with the image.

A method of an example embodiment may determine the data to be presented by modifying data options depending upon whether the image is being captured or was previously captured and is being played back. For example, the method of an embodiment causes the image to be presented while capturing video footage including the image. In this embodiment, the method determines the data to be presented by cycling through a plurality of types of instantaneous data in response to rotation of the dial wheel. As another example, the method causes the image to be presented by causing previously captured video footage including the image to be replayed. In this example embodiment, the method determines the data to be presented by cycling through a plurality of types of both instantaneous and cumulative data in response to rotation of dial wheel. In another embodiment, the method causes a map image to be presented. In this example embodiment, the method determines the data to be presented by modifying a level of specificity of the data in response to rotation of the dial wheel.

The method of an example embodiment modifies the data to be presented in an instance in which rotation of the dial wheel is paused for at least a predefined period of time, but not in an instance in which the dial wheel is rotated without pausing for at least the predefined period of time. In an instance in which the image to be presented is included within video footage, the method of an example embodiment may pause replay of the video footage while the dial wheel is rotated. In example embodiment, the rotatable dial wheel defines a plurality of predefined positions associated with respective types of data. In this example embodiment, the method also removes data from the image that is presented in an instance in which the dial wheel is between two neighboring predefined positions. In an example embodiment, the method also includes changing an operational mode in response to tilting of a device including the dial wheel beyond a predefined angular orientation followed by a return of the device to the predefined angular orientation.

In another example embodiment, an apparatus is provided that includes at least one processor and at least one memory including computer program code with the at least one memory and the computer program code configured to, with the processor, cause the apparatus to at least cause an image to be presented and to receive input provided via a rotatable dial wheel while the image is presented. The at least one memory and the computer program code are further configured to, with the processor, cause the apparatus of an example embodiment to determine data to be presented based upon the input including modification of the data to be presented in response to the rotation of the dial wheel. The at least one memory and the computer program code are also configured to, with the processor, cause the apparatus of this example embodiment to cause the data that is determined based on the input to be presented concurrent with the image.

The at least one memory and the computer program code are also configured to, with the processor, cause the apparatus of an example embodiment to determine the data to be presented by modifying the data options depending upon whether the image is being captured or was previously captured and is being played back. In an instance in which the image is presented while capturing video footage including the image, the at least one memory and the computer program code are configured to, with the processor, cause the apparatus of an example embodiment to determine the data to be presented by cycling through a plurality of types of instantaneous data in response to rotation of the dial wheel. In contrast, in an instance in which previously captured video footage including the image is replayed, the at least one memory and the computer program code are configured to, with the processor, cause the apparatus of an example embodiment to determine the data to be presented by cycling through a plurality of types of both instantaneous and cumulative data in response to rotation the dial wheel. Still further, in an instance in which the image to be presented is a map image, the at least one memory and the computer program code are configured to, with the processor, cause the apparatus of an example embodiment to determine the data to be presented by modifying a level of specificity of the data in response to rotation of the dial wheel.

The at least one memory and the computer program code are configured to, with the processor, cause the apparatus of an example embodiment to modify data to be presented by modifying the data to be presented in an instance in which the rotation of the dial wheel is paused for at least a predefined period of time, but not in an instance in which the dial will is rotated without pausing for at least the predefined period of time. In an instance in which the image to be presented is included video footage, the at least one memory and the computer program code are further configured to, with the processor, cause the apparatus of an example embodiment to pause replay of the video footage while the dial wheel is rotating. In example embodiment, the rotatable dial wheel defines a plurality of predefined positions associated with respective types of data. In this example embodiment, the at least one memory and the computer program code are further configured to, with the processor, cause the apparatus to remove data from the image that is presented in an instance in which the dial wheel is between two neighboring predefined positions. The at least one memory and the computer program code may be further configured to, with the processor, cause the apparatus to of an example embodiment to change an operational mode in response to tilting of a device including the dial wheel beyond a predefined angular orientation followed by a return of the device to the predefined angular orientation.

In a further example embodiment, a computer program product is provided that includes at least one non-transitory computer-readable storage medium having computer-executable program code portions stored therein with the computer-executable program code portions including program code instructions configured to cause an image to be presented and program code instructions configured to receive input provided via a rotatable dial wheel while the image is presented. The computer-executable program code portions of this example embodiment also include program code instructions configured to determine data to be presented based upon the input. In this regard, the program code instructions configured to determine the data to be presented include program code instructions configured to modify the date to be presented in response to rotation of the dial wheel. The computer-executable program code portions of this example embodiment also include program code instructions configured to cause data that is determined based on the input to be presented concurrent with the image.

The program code instructions configured to determine the data to be presented may include program code instructions configured to modify data options based upon whether the image is being captured or was previously captured and is being played back. In an instance in which the image is caused to be presented while capturing video footage including the image, the program code instructions configured to determine the data to be presented may include program code instructions configured to cycle through a plurality of types of instantaneous data in response to rotation of the dial wheel. Alternatively, in an instance in which the image is caused to be presented while causing previously captured video footage including the image to be replayed, the program code instructions configured to determine the data to be presented include program code instructions configured to cycle through a plurality of types of both instantaneous and cumulative data in response to rotation of the dial wheel. Still further, in an instance in which the image to be presented is a map image, the program code instructions configured to determine the data to be presented may include program code instructions configured to modify a level of specificity of the data in response to rotation of the dial wheel.

The program code instructions configured to modify the data to be presented may include program code instructions configured to modify the data to be presented in an instance in which rotation of the dial wheel is paused for at least a predefined period of time, but not in an instance which dial wheel is rotated without pausing for at least the predefined period of time. In an instance in which the image is caused to be presented by causing video footage including the image to be presented, the computer-executable program code portions may further include program code instructions configured to pause replay of the video footage while the dial wheel is rotated. In an example embodiment, the rotatable dial wheel defines a plurality of predefined positions associated with different respective types of data. In this example embodiment, the computer-executable program code portions further include program code instructions configured to remove data from the image that is presented in an instance in which the dial wheel is between two neighboring predefined positions. In an example embodiment, the computer-executable program code portions also include program code instructions configured to change an operational mode in response to tilting of a device including the dial wheel beyond a predefined angular orientation followed by a return of the device to the predefined angular orientation.

And yet another example embodiment, an apparatus is provided that includes means for causing an image to be presented and means for receiving input provided via a rotatable dial wheel while the image is presented. The apparatus of this example embodiment also includes means for determining data to be presented based upon the input. In this regard, the means for determining the data to be presented includes means for modifying the data to be presented in response to rotation of the dial wheel. The apparatus of this example embodiment also includes means for causing the data that is determined based on the input to be presented concurrent with the image.

BRIEF DESCRIPTION OF THE DRAWINGS

Figure 1A:
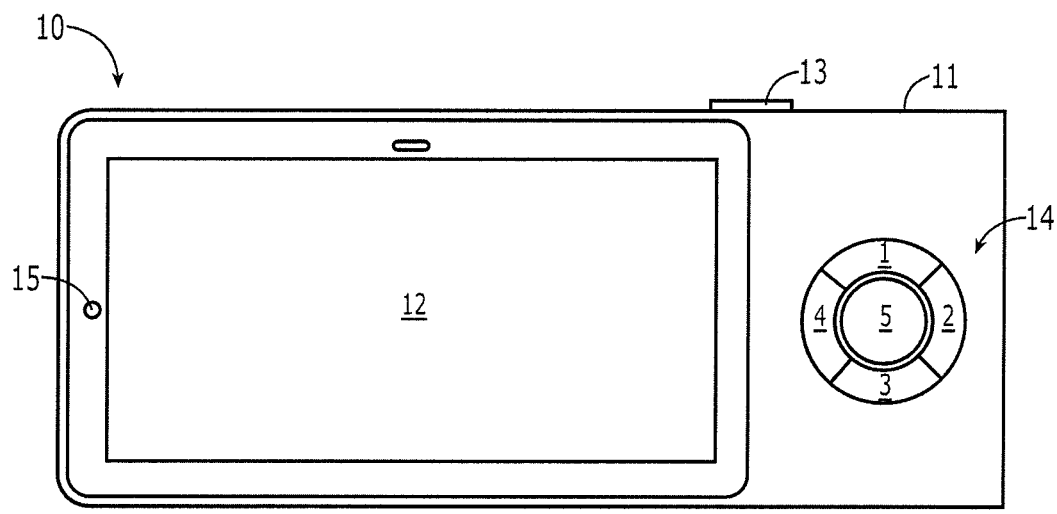
Figure 1B:
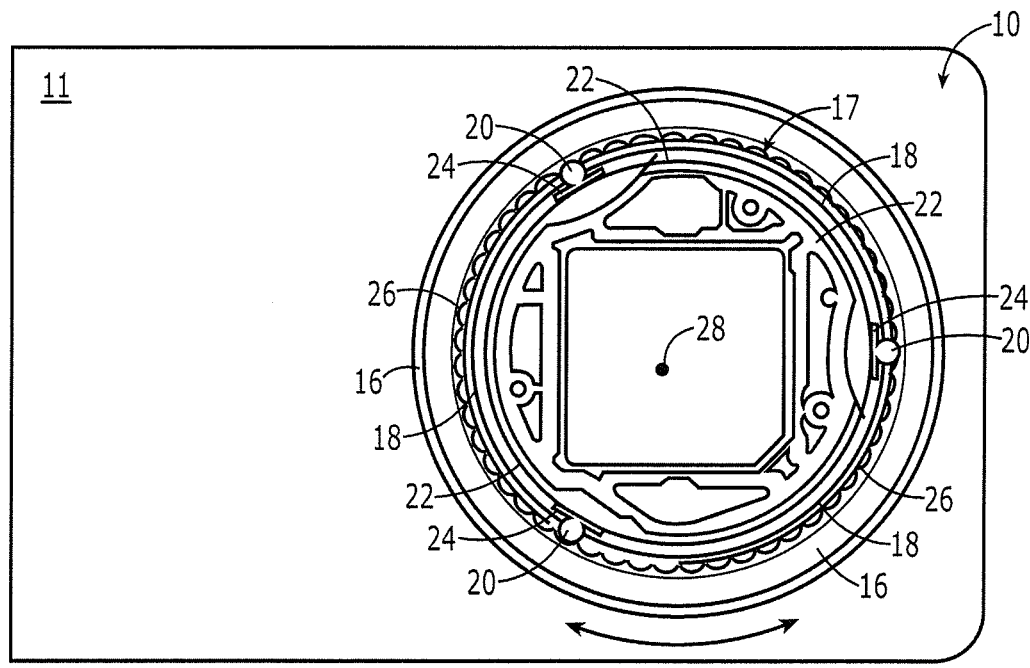
Figure 2:
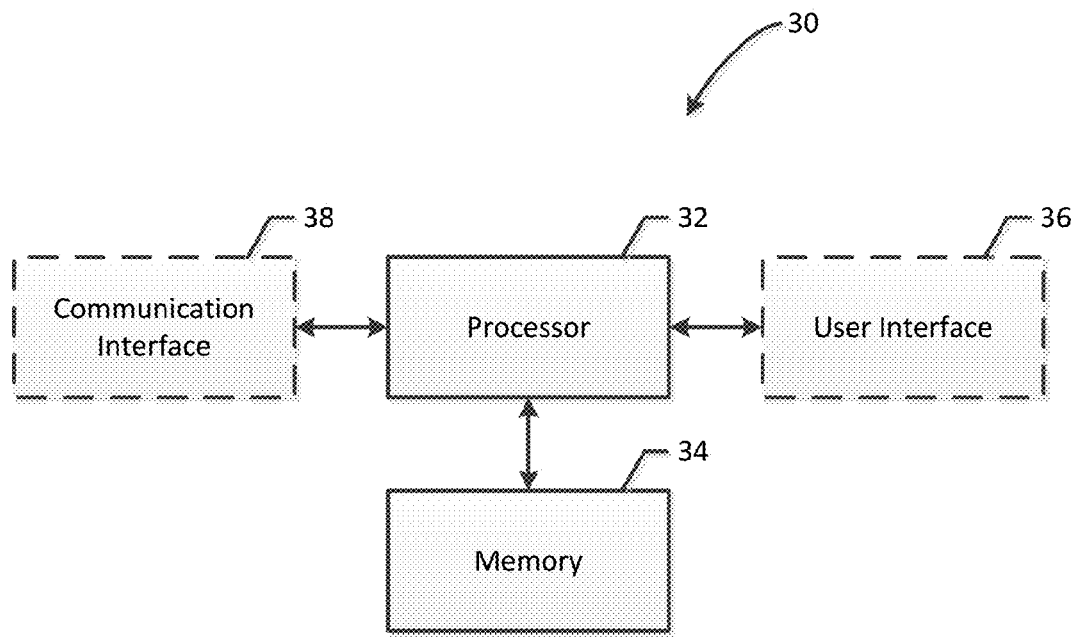
Figure 3:
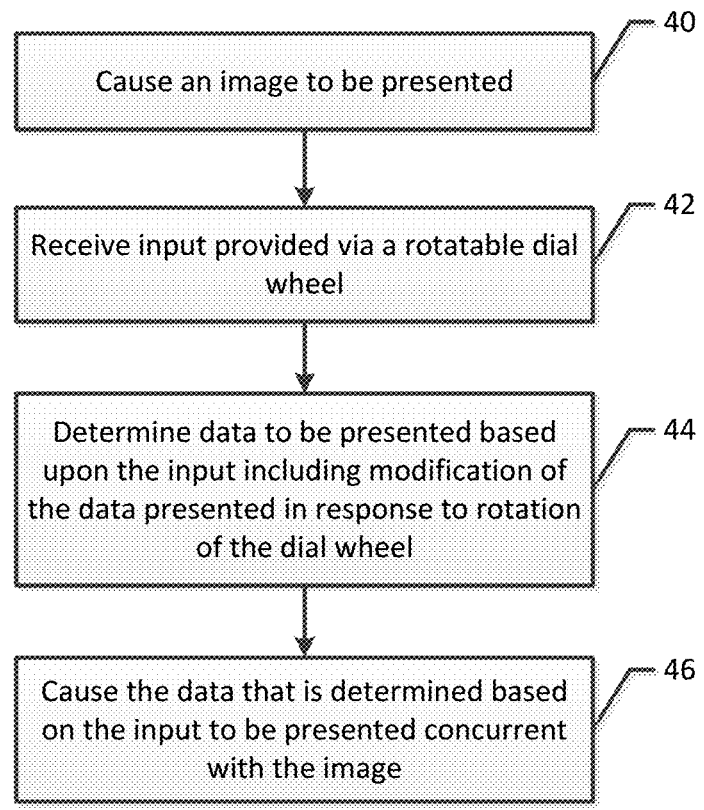
Figure 4:
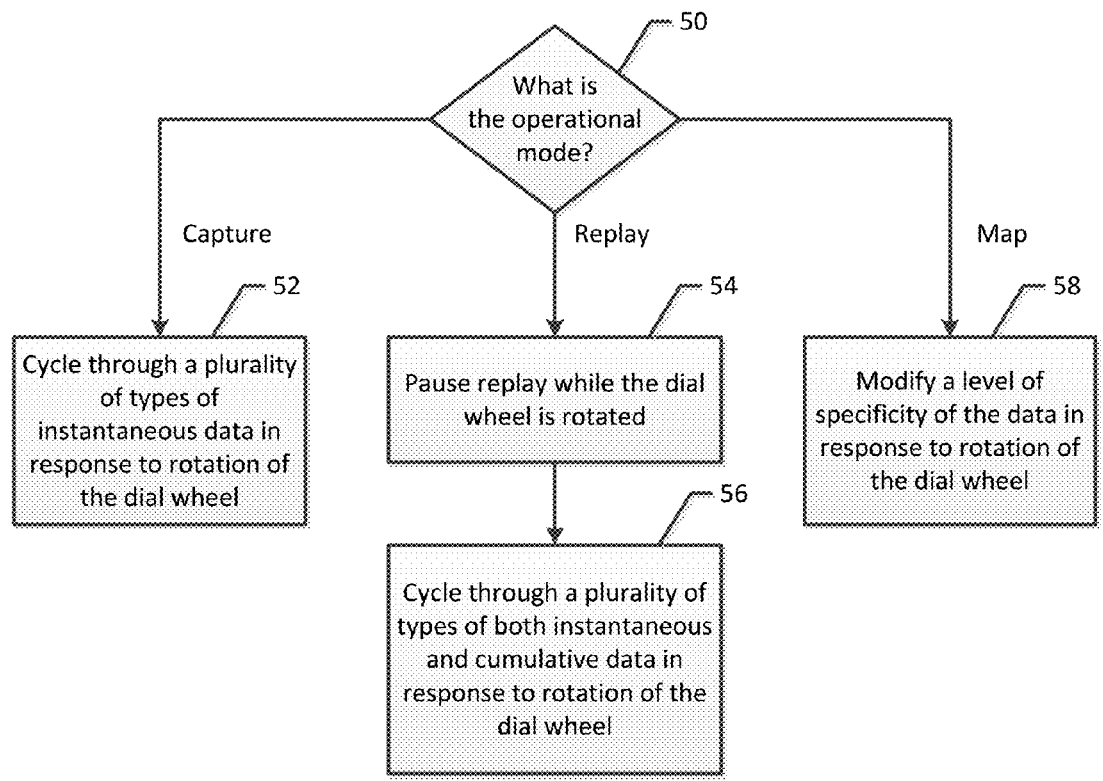
Figure 7:
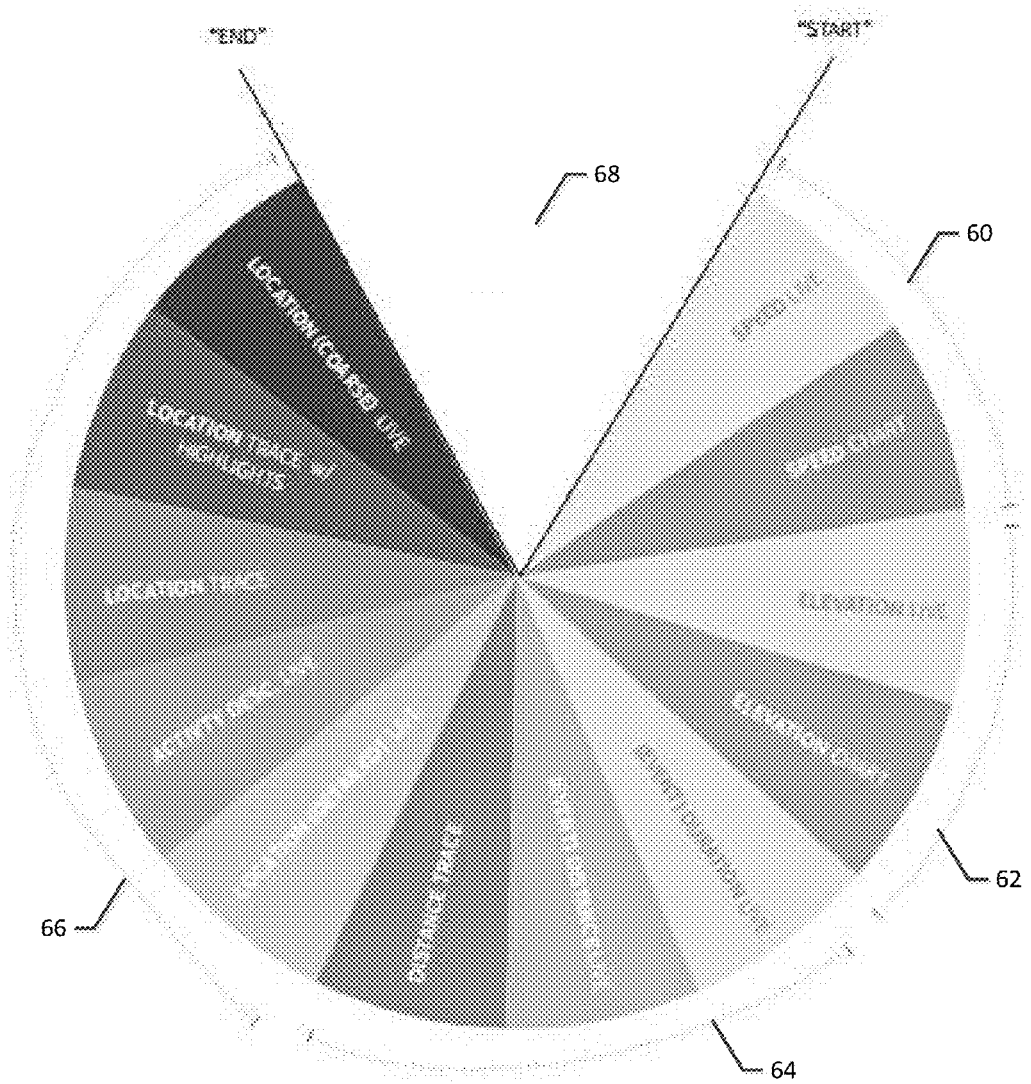
Figure 8A:
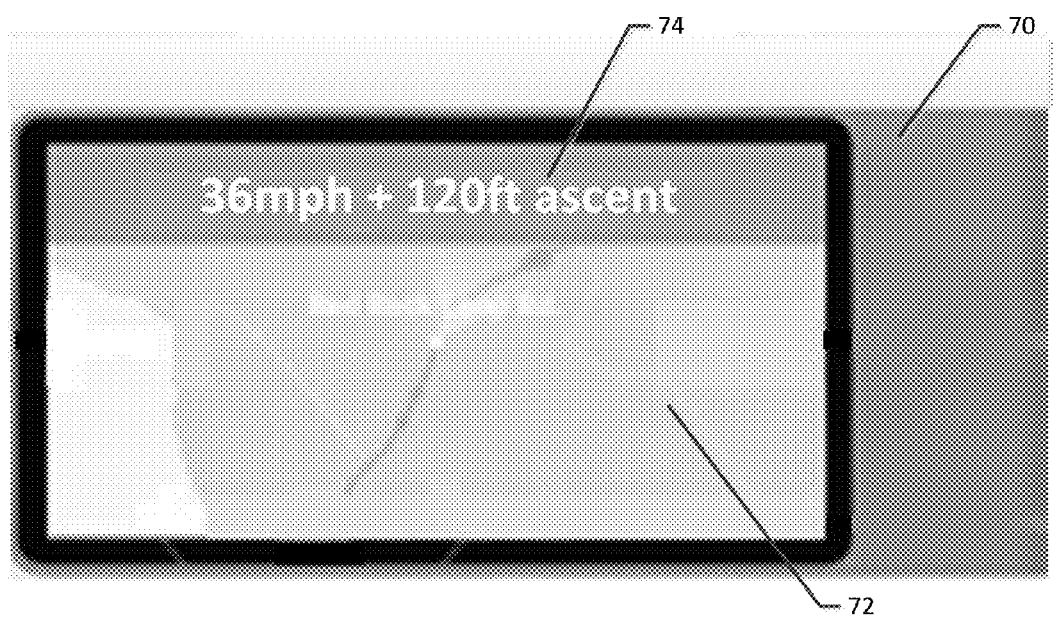
Figure 8B:
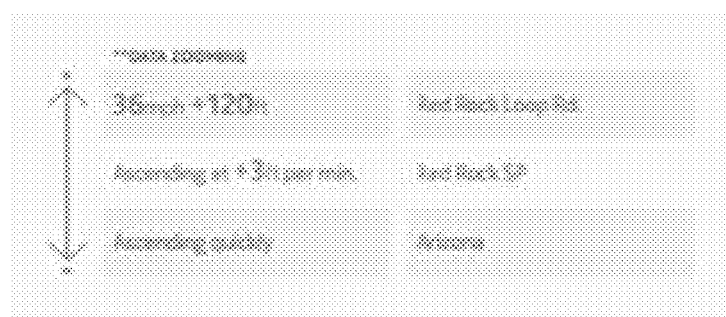
Figure 9:
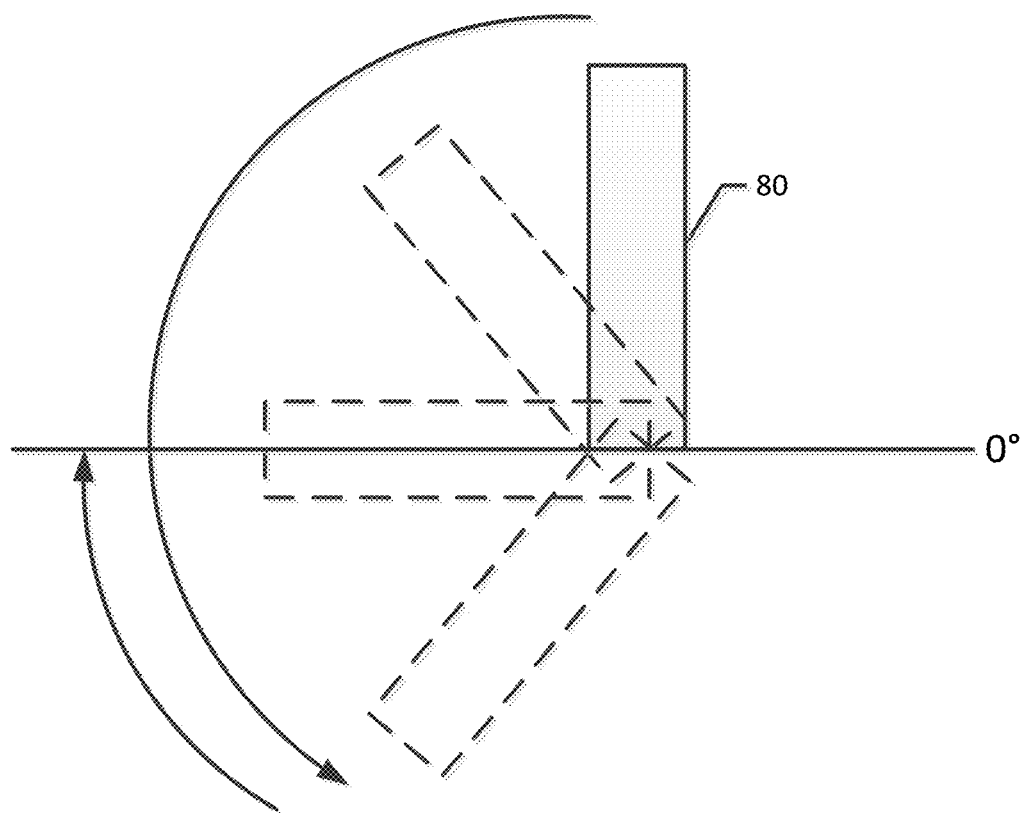

Having thus described certain embodiments of the invention in general terms, reference will now be made to the accompanying drawings, which are not necessarily drawn to scale, and wherein:

FIGS. 1a and 1b are plan views of opposite sides of a display device, such as a camera, that may be specifically configured in accordance with an example embodiment of the present invention;

FIG. 2 is a block diagram of an apparatus that may be specifically configured in accordance with an example embodiment of the present invention;

FIG. 3 is a flowchart illustrating operations performed, such as by the apparatus of FIG. 2, in accordance with an example embodiment of the present invention;

FIG. 4 is a flowchart illustrating operations performed, such as by the apparatus of FIG. 2, in accordance with an example embodiment of the present invention;

FIGS. 5a-5f are a sequence of screen displays that are presented while capturing an image and that illustrate a plurality of types of instantaneous data that may be presented in response to rotation of a dial wheel in accordance with an example embodiment of the present invention;

FIGS. 6a-6l are a sequence of screen displays that are presented while replaying a previously captured image and that illustrate a plurality of types of instantaneous and cumulative data that may be presented in response to rotation of a dial wheel in accordance with an example embodiment of the present invention;

FIG. 7 is a schematic representation of the different types of instantaneous and cumulative data that may be presented in response to rotation of a dial wheel to respective predefined positions in accordance with an example embodiment of the present invention;

FIG. 8a illustrates a display device operating in a map mode with data overlaid upon the map image;

FIG. 8b depicts the varying levels of specificity of the data that may be overlaid upon the map image of FIG. 8a in accordance with an example embodiment of the present invention; and FIG. 9 is a side view depicting the tilting of a display device in order to change the mode of operation of the display device in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product (s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus and computer program product are provided in accordance with an example embodiment in order to controllably select the data that is presented concurrent with an image. As such, a user may review a variety of data that is associated with an image and may select the desired type of data to be displayed concurrent with the image. The types of data that are available for concurrent display with an image may depend upon the operational mode, such as a capture mode in which the image is currently being captured, a reply mode in which the image was previously captured and is now being replayed or a map mode in which the image is a map image. By providing an intuitive mechanism by which a user may consider the various types of data that may be displayed concurrent with an image and may then controllably select a desired type of data to be displayed with the image, the resulting user experience may be enhanced.

The method, apparatus and computer program product may be embodied by or otherwise associated with a variety of display devices. For example, the method, apparatus and computer program product of an example embodiment may be embodied by or otherwise associated with a camera, a video recorder, a video player, a personal digital assistant (PDA), a mobile telephone, a smart phone, a companion device, for example, a smart watch, a mobile television, a laptop computer, a tablet computer, a touch surface or the like in order to facilitate the display of data in conjunction with an image. The method, apparatus and computer program product may permit the user of a display device to modify the data that is to be presented in response to user input provided via a rotatable dial wheel. Thus, the method, apparatus and computer program product may provide for an intuitive, precise and responsive input mechanism such that the user experience may be enriched by the more straight forward selection of the data to be displayed concurrent with an image, such as during the capture of video footage, the replay of video footage or the presentation of a map.

By way of example of a display device with which the method, apparatus and computer program product of an example embodiment of the present invention may be associated, FIGS. 1a and 1b depict a camera 10 that may be specifically configured in accordance with an example embodiment in order to provide control over the selectable display of data concurrent with the image. In this regard, the camera may include a housing 11 having opposed first and second sides with the display 12 on the first side thereof. Although the camera may be embodied in a variety of different manners, the illustrated embodiment of a camera also includes a number of user interface elements, such as a shutter control 13 and a set of buttons 14 used, for example, for directional selection including up, right, down and left selection buttons. The user interface elements including the shutter control and the set of buttons are merely examples and many other types of buttons and user interface elements may be utilized. The camera may also include other elements which may include many different types of sensors and may additionally include user feedback elements 15, such as light emitting diodes (LEDs), which can indicate that the camera has power, for example.

The user input regarding the data to be displayed concurrent with the image may be provided via a rotatable dial wheel. As shown in FIG. 1b, for example, the camera 10 of the illustrated embodiment may include a dial wheel 16 carried by the second side of the housing 11, opposite the display 12. In one embodiment, the dial wheel is positioned about the lens of a camera 10. The rotatable dial wheel may be retained in position and may be configured for rotation in various manners. In an illustrated environment, a spring ball retention system 17 that includes a ring 18 through which balls 20 project serves to engage the rotatable dial wheel. Each ball of this example is connected to a spring 22 via a corresponding holding element 24. The rotatable dial wheel of this example embodiment is installed by pressing the rotatable dial wheel past the balls in order to be connected to the housing of the camera. During this process, each ball compresses the spring until the rim will just pass the balls, when the balls settle between the rims and the spring at least partially decompresses from its most compressed point. The inner surface 26 of the race may have a corrugated surface with each corrugation mating with a surface of a ball.

The rotatable dial wheel 16 may be moved clockwise or counterclockwise relative to its axis 28. The rotatable dial wheel may include a visible pattern on its exterior surface to provide an indication to the user as to the relative position and movement of the dial wheel. As such, the camera 10 of the illustrated embodiment may be configured to detect the position of the rotatable dial wheel and may take corresponding action in response thereto as described below.

Further details regarding a display device that includes a rotatable dial wheel 16 as shown in FIGS. 1a and 1b are provided by U.S. patent application Ser. No. 14/245,454 filed on Apr. 4, 2014, the contents of which are incorporated herein by reference. Although one example of a rotatable dial wheel is shown and described above, the rotatable dial wheel may be configured in a variety of different manners with the position of the rotatable dial wheel being detectable such that corresponding action may be taken in response to rotation of the dial wheel as described below.

The apparatus of an example embodiment may be embodied by a variety of different computing devices. For example, the apparatus may be embodied by the display device, such as a camera, a video recorder, a video player, a PDA, a mobile telephone, a smart phone, a companion device, for example, a smart watch, a mobile television, a laptop computer, a tablet computer, a touch surface or the like. However, the apparatus of another embodiment may be embodied by a computing device remote or distinct from the display device, but in communication therewith. In this example embodiment, the apparatus may be embodied by a fixed computing device, such as a personal computer, a computer workstation or the like, or a mobile terminal, such as a portable computer, a mobile telephone or the like.

Regardless of the manner in which the apparatus is embodied, the apparatus 30 of an example embodiment is depicted in FIG. 3. The apparatus may include, be associated with or otherwise in communication with a processor 32, a memory device 34 and optionally (as visually represented by the dashed outlines) a user interface 36 and/or a communication interface 38. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 30 may be embodied by a computing device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 32 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 32 may be configured to execute instructions stored in the memory device 34 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 30 of an example embodiment may also optionally include or otherwise be in communication with a user interface 36. The user interface may include a touch screen display, a keyboard, a mouse, a joystick or other input/output mechanisms. For example, in an embodiment in which the apparatus is embodied by the display device, such as a camera 10, the user interface may be embodied by the display 12 along with other user input mechanisms, such as the rotatable dial wheel 16. In some embodiments, the user interface, such as a display, speakers, or the like, may also be configured to provide output to the user. In this example embodiment, the processor 32 may comprise user interface circuitry configured to control at least some functions of one or more input/output mechanisms and/or to receive the user input provided via the input mechanisms, such as the rotatable dial wheel. The processor and/or user interface circuitry comprising the processor may be configured to control one or more functions of one or more input/output mechanisms through computer program instructions (for example, software and/or firmware) stored on a memory accessible to the processor (for example, memory device 34, and/or the like).

The apparatus 30 of an example embodiment may also optionally include a communication interface 38 that may be any means such as a device or circuitry embodied in either hardware or a combination of hardware and software that is configured to receive and/or transmit data from/to other electronic devices in communication with the apparatus. For example, in an embodiment in which the apparatus is remote from the display device, the apparatus may include a communication interface to facilitate communication with the display device. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

Referring now to FIG. 3, the operations performed, such as by the apparatus 30 of FIG. 2, in accordance with an example embodiment are depicted. As shown in block 40, the apparatus may include means, such as the processor 32, user interface 36 or the like, for causing an image to be presented. Various different types of images may be presented. For example, the display device may be configured to operate in accordance with a variety of operational modes, such as an image capture or viewfinder mode, a replay mode and/or a map mode. In the image capture mode, the apparatus, such as the processor, the user interface or the like, may be configured to cause the image to be presented while capturing video footage including the image. In the replay mode, the apparatus, such as the processor, the user interface or the like, may be configured to cause previously captured video footage including the image to be replayed. Further, in the map mode, the image that is caused to be presented may include a map image.

Regardless of the type of image to be presented and regardless of the operational mode of the display device, the apparatus 30 also include means, such as the processor 32, the user interface 36 or the like, for receiving input provided via a rotatable dial wheel 16 while the image is presented. See block 42 of FIG. 3. In this regard, the user may rotate the dial wheel, such as by rotating the dial wheel relative to the housing 11 that carries the rotatable dial wheel. The rotatable dial wheel may define a plurality of predefined positions. For example, each predefined position defined by the rotatable dial wheel may be associated with a different angular position or a different range of angular positions such that rotation of the dial wheel may alternatively place the rotatable dial wheel in any one of the different predefined positions.

As shown in block 44 of FIG. 3, the apparatus 30 also includes means, such as the processor 32 or the like, for determining data to be presented based upon the input provided via rotatable dial wheel 16. In this regard, the apparatus may include means, such as the processor or the like, for modifying the data to be presented in response to rotation of the dial wheel. In this regard, each of the plurality of predefined positions of the rotatable dial wheel may be associated with a different respective type of data. As such, the apparatus, such as the processor, may be configured to determine the predefined position of the rotatable dial wheel and may then determine the data to be presented to be the data associated with the predefined position of the rotatable dial wheel. A user may therefore modify the data that is to be presented by rotating the dial wheel until the dial wheel is in the predefined position associated with the type of data that the user desires to be presented.

The apparatus 30 also includes means, such as the processor 32, the user interface 36 or the like, for causing the data that is determined based upon the input, such as based upon the predefined position of the rotatable dial wheel 16, to be presented concurrent with the image. See block 46 of FIG. 3. In this regard, the selected type of data may be presented as a data overlay over the image. As such, a user may not only view the image, but may also take into account the data that relates to the image. As described below, the data may be instantaneous data that defines the value of a parameter at the time that the particular image that is being presented was captured. Alternatively, the data may be cumulative data that defines the value of a parameter that is determined over a period of time, such as an average, a maximum or a minimum over the period of time during which the image or video footage including the image was captured.

The data options, that is, the types of data that may be presented, may vary depending upon the operational mode of the display device, such as based upon whether the display device is operating in a capture mode to capture video footage, in a replay mode to replay video footage or in a map mode. Thus, the apparatus 30 may include means, such as the processor 32 or the like, for modifying the data options depending upon whether the image is being captured or was previously captured and is now being played back.

As shown in the block 50 of FIG. 4, for example, the apparatus 30 may therefore include means, such as the processor 32 or the like, for determining the operational mode of the display device. In an instance in which the display device is operating in a capture mode, e.g., a viewfinder mode, in with video footage including the image is being captured, the image may be cause to be presented while capturing video footage including the image. In this embodiment, the data to be presented may be determined by cycling through a plurality of types of instantaneous data in response to rotation of the dial wheel 16. See block 52 of FIG. 4. For example, the plurality of predefined positions defined by the rotatable dial wheel may be associated with different types of instantaneous data that is being captured or otherwise collected concurrently with the video footage that is being recorded.

Figure 5A:
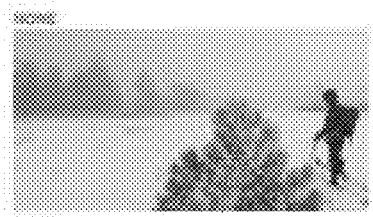
Figure 5B:
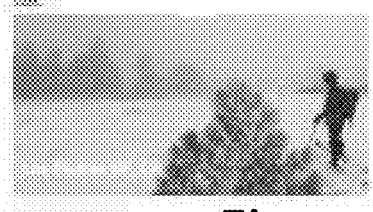
Figure 5C:
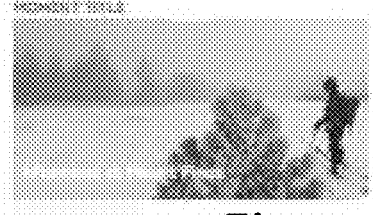
Figure 5D:
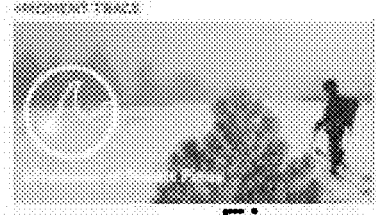
Figure 5E:
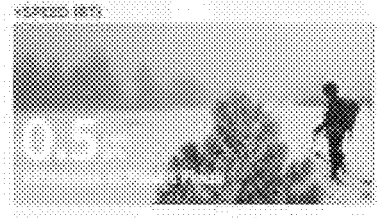
Figure 5F:
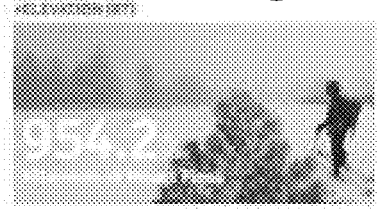

By way of example, FIGS. 5a-5f depict six screen displays of a display device in a capture mode in which different types of instantaneous data are presented concurrent with an image that is part of the video footage currently being captured. As shown in FIG. 5a in which the rotatable dial wheel 16 is in a first predefined position, the image is presented without any data overlay. Upon rotating the dial wheel to a second predefined position associated with data defining the current location, the current location, e.g., Los Padres National Forest (NF), California, may be overlaid upon the image, as shown in FIG. 5b. In an instance in which location services and/or the global positioning system (GPS) are not available, the location data may note the unavailability and, in some embodiments, may default to a higher level of granularity. Following rotation of the dial wheel to a third predefined position associated with the title of the moment, the title of the moment, that is, the title of the current video clip, e.g., Afternoon at Mount Pinos, may be overlaid upon the image as shown in FIG. 5c. Rotation of the dial wheel to a fourth predefined position associated with the moment trace may cause the trace tracking the movement during the capture of the moment, that is, during capture of the video clip, to be displayed concurrent with the images shown in FIG. 5d. As shown in FIG. 5e, rotation of the dial wheel to a fifth predefined position associated with instantaneous speed at the time that the image is captured may cause the instantaneous speed to be presented concurrent with the image. Finally, rotation of the dial wheel to a sixth predefined position associated with the instantaneous elevation t the time that the image was captured may cause the current elevation to be displayed concurrent with the image as shown in FIG. 5f. Further rotation of the dial wheel may return the dial wheel to the first predefined position, thereby resulting in a cycling of the different types of instantaneous data.

Alternatively, in an instance in which to display device is in a replay mode in which previously captured video footage including the image is replayed, the apparatus 30, such as the processor 32 or the like, may be configured to determine the data to be presented by cycling through a plurality of types of both instantaneous and cumulative data in response to rotation of the data wheel 16. See block 56 of FIG. 4. In this regard, the different predefined positions of the rotatable data wheel may each be associated with a different type of either instantaneous or cumulative data that will be presented concurrent with the replay of the video footage including the image.

Figure 6A:
Figure 6B:
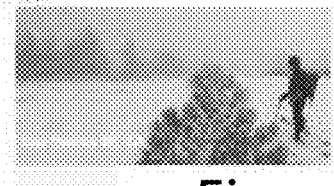
Figure 6C:
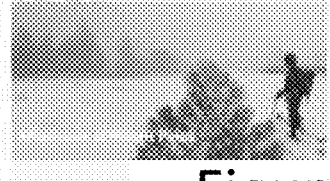
Figure 6D:
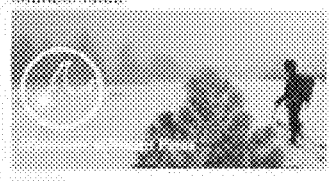
Figure 6E:
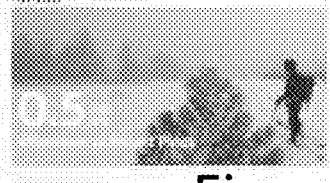
Figure 6F:
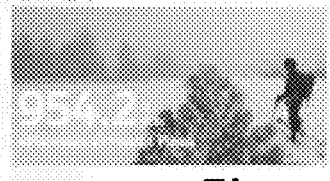
Figure 6G:
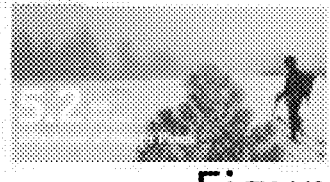
Figure 6H:
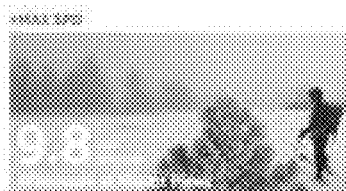
Figure 6I:
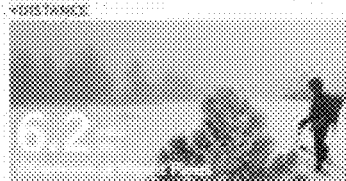
Figure 6J:
Figure 6K:
Figure 6L:
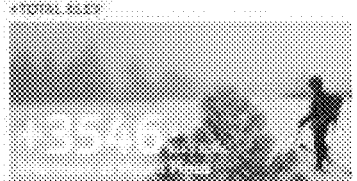

By way of example, FIGS. 6a-6l illustrate twelve screen displays with different types of data overlaid upon the image during the replay of video footage including the image. As shown in FIG. 6a, the placement of the data wheel 16 in a first predefined position while previously captured video footage is being replayed may cause the video footage including the image to be presented without a data overlay. As shown in FIGS. 6b-6f, subsequent rotation of the dial wheel to second, third, fourth, fifth and sixth predefined positions may cause different types of instantaneous data to be presented concurrent with the replay of the video footage including the image in the same manner as described above in conjunction FIGS. 5b-5f in the capture mode. Thereafter, further rotation of the dial wheel to different predefined positions may cause different types of cumulative data to be presented concurrent with the replay of the video footage including the image. As shown in FIG. 6g, for example, the average speed during the capture of a video clip may be presented in response to the dial wheel being in a seventh predefined position. Further rotation of the dial wheel to an eighth predefined position may cause the maximum speed during the capture of the video footage to be presented as shown in FIG. 6h. Rotation of the dial wheel to a ninth predefined position may cause the cumulative distance covered during the capture of the video image to be presented as shown in FIG. 6i. In response to rotation of the dial wheel to a tenth predefined position, the average rate of ascent during the capture of the video footage including the image may be presented concurrent with the video footage that is being replayed as shown in FIG. 6j. Placement of the rotatable dial will in an eleventh position may cause the maximum elevation experienced during the capture of the video footage to be displayed concurrent with the replay of the video footage, as shown in FIG. 6k. While rotation of the dial wheel to a twelfth predefined position may cause the total elevation traversed during the capture of video footage to be displayed concurrent with the replay of the video footage as shown in FIG. 6.

By way of further example, a schematic representation of a plurality of different predefined positions of a dial wheel 16 is shown in FIG. 7. In this embodiment, the dial wheel may define twelve predefined positions between the start position and the end position. Each predefined position may be defined by a predefined angular range and is associated with a corresponding type of data to be presented concurrent with an image. In the illustrated embodiment, the predefined positions defined by the dial wheel are organized such that the different types of data are logically grouped into a first group 60 of data types related to speed while capturing the video footage, a second group 62 of data types related to elevation while capturing the video footage, a third group 64 of data types related to the journey undergone while recording the video footage and a fourth group 66 of data types related to the activity conducted while recording the video footage. However, the dial wheel may define a different number of predefined positions and may associate those predefined positions with different data types arranged in different manners in other embodiments.

In the illustrated embodiment, however, the dial wheel 16 also defines an angular range 68 between the start position and the end position with no data being overlaid onto the image in an instance in which the position of the dial wheel is within this range. The apparatus 30, such as the processor 32, may be configured to detect subsequent rotation of the dial wheel to any of the other predefined positions and may correspondingly cause the data associated with the predefined position to be presented concurrent with the presentation of the image.

In an instance in which the display device is operating in a map mode, the image that is presented may be a map image. In this example embodiment, the apparatus 16, such as a processor 32, may be configured to determine the data to be presented by modifying the level of specificity of the data in response to rotation of the dial wheel 16. See block 58 of FIG. 4. Thus, the same type of data may be displayed upon the map image regardless of the input provided via the rotatable dial wheel. However, rotation of the dial wheel may cause a level of specificity of the data to correspondingly change, such as by presenting data of the same type with more specificity in response to rotation of the dial wheel in one direction and by presenting data of the same type with less specificity in response to rotation of the dial wheel in the opposite direction.

As shown in FIG. 8a, for example, the display device 70 may cause a map image 72 to be presented with a designation 74 of the current location and for data to be presented concurrent with the map image to define the average speed during a trip and the extent of the ascent during the trip. In this example embodiment, FIG. 8b depicts the range of data of different levels of specificity that may be presented depending upon the input provided by rotation of the dial wheel 16. In this regard, the data relating to the average speed and the extent of the ascent during the trip may vary from less specific data, such as a general description that the trip involved ascending quickly, to an intermediate level of specificity, such as a notation that the rate of ascent was +3 feet per minute, to more specific data, such as a detailed description that the trip at a speed of 36 miles per hour and involved a 120 feet ascent. Similarly, the location may be presented with less specificity, such as by state, e.g., Arizona, with an intermediate level of specificity, such as by region, e.g., Red Rocks State Park, or more specificity, such as a street location, e.g., Red Rock Loop Road. Thus, by rotation of the dial wheel, the specificity with which the data that is presented concurrent with the map image may be modified.

The data, such as instantaneous data, may be captured concurrent with the capture of the image, such as the capture of video footage including the image. The data that is associated with respective images may be stored, such as in memory 34, either with the images or otherwise in association with the images. For cumulative data, the data values may be determined, such as by the processor 32, following the capture of the associated image, such as following capture of a video clip that includes the image. The cumulative data may then be associated with the video clip, such as each image within the video clip.

During the presentation of data concurrent with the replay of video footage including the image, the instantaneous data captured concurrently with the capture of a respective image that is currently being presented may, but need not necessarily be presented with the image during the replay. Instead, cumulative data may be identified by the user for display concurrent with the image with the cumulative data relating not just to the respective image that is currently being presented, but to the extent of the video footage that includes the image. As shown in FIGS. 5a-5f, the user may select different types of data to be presented concurrent with an image during the capture of the image. In the absence of contrary instructions during the replay of the image, such as replay of video footage including the image, the same data identified by the user during the capture of the image may be presented during the replay of the image. However, in response to user input during the replay of the image, such as by rotation of the dial wheel 16, the user may identify other types of data, such as a type of cumulative data, to be presented concurrent with the image such that a different type of data than that identified during the capture of the image is thereafter presented with the replay of the image.

In order to facilitate the transition from the presentation of one type of data to another type of data in response to rotation of the dial wheel 16, the apparatus 30, such as a processor 32, may distinguish between rotation of the dial wheel relatively rapidly through a plurality of different predefined positions and the selection of a particular predefined position of the dial wheel. As such, the apparatus, such as the processor, may be configured to modify the data to be presented in an instance in which the rotation of the dial wheel is paused for at least a predefined period of time. However, in one embodiment, in an instance in which the dial wheel is rotated without pausing for at least the predefined period of time, the data that is presented is not modified during the rotation of the dial wheel, but only upon cessation of the rotation for at least the predefined period of time. Moreover, in an instance in which the apparatus, such as the processor, detects that the dial wheel is being rotated, the processor may cause the data overlay to be removed such that no data is overlaid upon the image during rotation of the dial wheel until the dial wheel is positioned at a predefined position for at least the predefined period of time. As such, the apparatus, such as the processor, may be configured to remove data from the image, as such by removing the data overlay, in an instance in which the dial wheel is between neighboring predefined positions, such as during rotation at the dial wheel. The apparatus of an example embodiment, such as the processor, the user interface 36 or the like, may also pause the replay of the video footage while the dial wheel is rotated until the dial wheel has been set at a predefined position for at least the predefined period of time. See block 54 of FIG. 4.

The operational mode of the display device may be controlled in various manners. For example, the user interface 36 may include user inputs configured to select a respective operational mode. In an example embodiment, however, the display device may include one or more sensors, such as an orientation or rotation sensor, e.g., an accelerometer, a gyroscope or the like. In this example embodiment, the apparatus 30, such as the processor 32, may be responsive to the sensor(s) in order to detect an instance in which the display device is tilted beyond a predefined angular orientation, such as beyond a horizontal orientation, e.g., an angle of 0°, followed by a return of the display device to the predefined angular orientation. In response to detecting this type of movement of the display device, the operational mode may be changed. For example, the display device may be configured to cycle through the different operational modes with the display device advancing to the next operational mode in response to detection of the tilting movement of the display device in this manner. Alternatively, the display device may be configured to enter the map mode in response to tilted movement in this manner and to exit the map mode in response to a repeat of this tilted movement.

In example embodiment, the apparatus 30, such as the processor 32, may be configured to require the device to be tilted beyond the predefined angular orientation, such as to a downwardly sloping orientation with the far edge of the display device that is furthest from the user being lower than the nearer edge of the display device so is closer to the user, for a at least a predefined period of time and/or by a least a predefined angular amount, e.g., by at least 15°, and also for the return of the display device to the predefined angular orientation to remain at the predefined angular orientation for at least the predetermined time period. In addition, the predefined angular orientation may be defined as a range of angles to facilitate the return of the device to the predefined angular orientation. By way of example of the tilting movement of a display device that may be recognized and that may trigger the change in operational mode of the display device, FIG. 9 depicts the predefined angular orientation to be 0° with the display device 80 required to be tilted beyond 0° and then returned to 0° to change the mode of operation. However, the apparatus may be configured to recognize other predefined angular orientations in other embodiments.

As described above, a method, apparatus 30 and computer program product are therefore provided to facilitate the display of data in conjunction with an image. In this regard, a method, apparatus and computer program product may permit the data that is to be presented to be modified in response to user input provided via a rotatable dial wheel 16. Thus, the method, apparatus and computer program product may provide for an intuitive, precise and responsive input mechanism such that the user experience may be enriched by the controlled selection of the data to be displayed concurrent with an image, such as during the capture of video footage, the replay of video footage or the presentation of a map.

In addition to supporting the controlled overlay of data upon an image, the apparatus 30 and/or the display device may be configured to support one or more other functions. For example, the apparatus of an example embodiment may also support a mapping application so as to present maps or otherwise provide mapping information. In order to support a mapping application, the apparatus may include or otherwise be in communication with a geographic database, such as may be stored in memory 34. For example, the geographic database includes node data records, road segment or link data records, point of interest (POI) data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or global positioning system (GPS) data associations (such as using known or future map matching or geo-coding techniques), for example.

In example embodiments, the road segment data records are links or segments representing roads, streets, or paths, as can be used in the calculated route or recorded route information for determination of one or more personalized routes, according to example embodiments. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the computing device, for example. The navigation-related functions can correspond to vehicle navigation, pedestrian navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the server side geographic database can be a master geographic database, but in alternate embodiments, the client side geographic database can represent a compiled navigation database that can be used in or with the computing device to provide navigation and/or map-related functions. For example, the geographic database can be used with the end user device to provide an end user with navigation features. In such a case, the geographic database can be downloaded or stored on the computing device, such as in applications, or the computing device can access the geographic database through a wireless or wired connection (such as via a server and/or a communication network), for example.

In one embodiment, the apparatus 30 and/or the display device can be an in-vehicle navigation system, a personal navigation device (PND), a portable navigation device, a cellular telephone, a mobile phone, a PDA, a watch, a camera, a computer, and/or other device that can perform navigation-related functions, such as digital routing and map display. Thus, in addition to accessing various media files as described above, the user can use the computing device of an example embodiment for navigation and map functions such as guidance and map display, for example, and for determination of one or more personalized routes or route segments based on one or more calculated and recorded routes, according to example embodiments.

As described above, FIGS. 3 and 4 illustrate flowcharts of an apparatus 30, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 34 of an apparatus employing an embodiment of the present invention and executed by a processor 32 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    causing an image to be presented;
    receiving input provided via a rotatable dial wheel while the image is presented;
    determining data to be presented based upon the input by cycling through a plurality of different types of instantaneous data in response to rotation of the dial wheel, wherein the instantaneous data defines a value of a parameter at a time at which the image that is caused to be presented was captured, and wherein determining data comprises modifying the data to be presented, while continuing to cause the image to be presented, in response to rotation of the dial wheel; and
    causing the data that is determined based on the input to be presented concurrent with the image.

2. A method according to claim 1 wherein determining the data to be presented comprises modifying data options depending upon whether the image is being captured or was previously captured and is being played back.

3. A method according to claim 1 wherein causing an image to be presented comprises causing the image to be presented while capturing video footage including the image.

4. A method according to claim 1 wherein causing an image to be presented comprises causing previously captured video footage including the image to be replayed, and wherein determining the data to be presented comprises cycling through a plurality of types of both instantaneous and cumulative data in response to rotation of the dial wheel.

5. A method according to claim 1 wherein causing an image to be presented comprises causing a map image to be presented, and wherein determining the data to be presented comprises modifying a level of specificity of the data in response to rotation of the dial wheel.

6. A method according to claim 1 wherein modifying data to be presented comprises modifying the data to be presented in an instance in which rotation of the dial wheel is paused for at least a predefined period of time, but not in an instance in which the dial wheel is rotated without pausing for at least the predefined period of time.

7. A method according to claim 1 wherein causing an image to be presented comprises causing video footage including the image to be presented, and wherein the method further comprises pausing replay of the video footage while the dial wheel is rotated.

8. A method according to claim 1 wherein the rotatable dial wheel defines a plurality of predefined positions associated with respective types of data, wherein the method further comprises removing data from the image that is presented in an instance in which the dial wheel is between two neighboring predefined positions.

9. A method according to claim 1 further comprising changing an operational mode in response to tilting of a device including the dial wheel beyond a predefined angular orientation followed by a return of the device to the predefined angular orientation.

10. An apparatus comprising at least one processor and at least one memory including computer program code, the at least one memory and computer program code configured to, with the processor, cause the apparatus to at least:
cause an image to be presented;
receive input provided via a rotatable dial wheel while the image is presented;
determine data to be presented based upon the input by cycling through a plurality of different types of instantaneous data in response to rotation of the dial wheel, wherein the instantaneous data defines a value of a parameter at a time at which the image that is caused to be presented was captured, and wherein determining data comprises modifying the data to be presented, while continuing to cause the image to be presented, in response to rotation of the dial wheel; and
cause the data that is determined based on the input to be presented concurrent with the image.

11. An apparatus according to claim 10 wherein the at least one memory and the computer program code are configured to, with the processor, cause the apparatus to determine the data to be presented by modifying data options depending upon whether the image is being captured or was previously captured and is being played back.

12. An apparatus according to claim 10 wherein the at least one memory and the computer program code are configured to, with the processor, cause the apparatus to cause an image to be presented by causing the image to be presented while capturing video footage including the image.

13. An apparatus according to claim 10 wherein the at least one memory and the computer program code are configured to, with the processor, cause the apparatus to cause an image to be presented by causing previously captured video footage including the image to be replayed, and wherein the at least one memory and the computer program code are configured to, with the processor, cause the apparatus to determine the data to be presented by cycling through a plurality of types of both instantaneous and cumulative data in response to rotation of the dial wheel.

14. An apparatus according to claim 10 wherein the at least one memory and the computer program code are configured to, with the processor, cause the apparatus to cause an image to be presented by causing a map image to be presented, and wherein the at least one memory and the computer program code are configured to, with the processor, cause the apparatus to determine the data to be presented by modifying a level of specificity of the data in response to rotation of the dial wheel.

15. A computer program product comprising at least one non-transitory computer-readable storage medium having computer-executable program code portions stored therein, the computer-executable program code portions comprising program code instructions configured to:
cause an image to be presented;
receive input provided via a rotatable dial wheel while the image is presented;
determine data to be presented based upon the input by cycling through a plurality of different types of instantaneous data in response to rotation of the dial wheel, wherein the instantaneous data defines a value of a parameter at a time at which the image that is caused to be presented was captured, and wherein determining data comprises modifying the data to be presented, while continuing to cause the image to be presented, in response to rotation of the dial wheel; and
cause the data that is determined based on the input to be presented concurrent with the image.

16. A computer program product according to claim 15 wherein the program code instructions configured to determine the data to be presented comprise program code instructions configured to modify data options depending upon whether the image is being captured or was previously captured and is being played back.

17. A computer program product according to claim 15 wherein the program code instructions configured to cause an image to be presented comprise program code instructions configured to cause the image to be presented while capturing video footage including the image.

18. A computer program product according to claim 15 wherein the program code instructions configured to cause an image to be presented comprise program code instructions configured to cause previously captured video footage including the image to be replayed, and wherein the program code instructions configured to determine the data to be presented comprise program code instructions configured to cycle through a plurality of types of both instantaneous and cumulative data in response to rotation of the dial wheel.

19. A computer program product according to claim 15 wherein the program code instructions configured to cause an image to be presented comprise program code instructions configured to cause a map image to be presented, and wherein the program code instructions configured to determine the data to be presented comprise program code instructions configured to modify a level of specificity of the data in response to rotation of the dial wheel.

20. A computer program product according to claim 15 wherein the computer-executable program code portions further comprise program code instructions configured to change an operational mode in response to tilting of a device including the dial wheel beyond a predefined angular orientation followed by a return of the device to the predefined angular orientation.

* * * * *